United States Patent
Arbuckle (10) Patent No.: US 8,089,691 B2
(45) Date of Patent: Jan. 3, 2012

(54) PROJECTION DEVICE FOR PATTERNED ILLUMINATION AND MICROSCOPY

(75) Inventor: John D. Arbuckle, Guelph (CA)

(73) Assignee: Quorum Technologies Inc., Guelph, Ontario (CA)

( * ) Notice: Subject to any disclaimer, the term of this patent is extended or adjusted under 35 U.S.C. 154(b) by 301 days.

(21) Appl. No.: 12/255,607

(22) Filed: Oct. 21, 2008

(65) Prior Publication Data

US 2009/0147354 A1    Jun. 11, 2009

Related U.S. Application Data

(60) Provisional application No. 61/012,478, filed on Dec. 10, 2007.

(51) Int. Cl.
*G02B 21/36* (2006.01)
(52) U.S. Cl. ......... 359/368; 359/363; 359/385; 396/432
(58) Field of Classification Search .......... 359/368–390, 359/363, 618; 396/432
See application file for complete search history.

(56) References Cited

U.S. PATENT DOCUMENTS

| | | | | |
|---|---|---|---|---|
| 3,545,355 A | * | 12/1970 | Cahall, Jr. | 396/432 |
| 3,623,807 A | * | 11/1971 | Gabler et al. | 355/18 |
| 4,302,087 A | * | 11/1981 | Reinheimer et al. | 396/432 |
| 4,303,340 A | * | 12/1981 | Hoffman | 356/636 |
| 4,518,230 A | * | 5/1985 | Weber | 359/375 |
| 4,567,478 A | * | 1/1986 | Schwab | 345/9 |
| 5,671,085 A | | 9/1997 | Gustafsson | |
| 6,376,818 B1 | * | 4/2002 | Wilson et al. | 250/201.3 |
| 7,335,866 B2 | | 2/2008 | Backs | |
| 2007/0007429 A1 | | 1/2007 | Fairley | |
| 2008/0291532 A1 | * | 11/2008 | Xu et al. | 359/383 |

OTHER PUBLICATIONS

Bauch, H., "Structured Illumination in Fluorescence Microscopy: Images Have Increased Sharpness, Contrast and Resolution in the Axial Direction," Bioscience Technology, Jul. 1, 2003.
Gustafsson, M.G.L., "Nonlinear Structured-Illumination Microscopy: Wide-Field Fluorescence Imaging With Theoretically Unlimited Resolution," PNAS (Proceedings of the National Academy of Sciences) 102(37):13081-13086, Sep. 2005.
Gustafsson, M.G.L., "Surpassing the Lateral Resolution Limit by a Factor of Two Using Structured Illumination Microscopy," Journal of Microscopy 198(2):82-87, May 2000.

(Continued)

*Primary Examiner* — Thong Nguyen
(74) *Attorney, Agent, or Firm* — Christensen O'Connor Johnson Kindness PLLC (57) ABSTRACT

A projection and detector device that attaches externally to the photo-port of a widefield microscope. The device includes a light source interface for receiving of illumination from a light source, the illumination defining an illumination path. A pattern mask is located within the illumination path for projecting one or a plurality of objects, structures, or patterns onto a sample located at the object plane of the optical microscope. The pattern mask may be used with structured illumination microscopy (SIM) to project a moving striped optical grid pattern or Ronchi Ruling onto the sample at the object plane in either fluorescence or reflected brightfield imaging. A mechanical or digital diaphragm may also be used, for techniques such as Fluorescence Recovery After Photobleaching (FRAP), fluorescence photoactivation, and targeted illumination. A computer linked with a charged coupled device (CCD) camera may be used to capture images for storage and further post-processing.

23 Claims, 5 Drawing Sheets

OTHER PUBLICATIONS

Gustafsson, M.G.L., et al., "I5M: 3D Widefield Light Microscopy With Better Than 100 nm Axial Resolution," Journal of Microscopy 195(1):10-16, Jul. 1999.

Gustafsson, M.G.L., et al., "Three-Dimensional Resolution Doubling in Widefield Fluorescence Microscopy by Structured Illumination," Biophysical Journal BioFAST 94:4957-4970, Mar. 2008.

"OPTICGRID®: Structured-Illumination Microscopy," Brochure, © 2006, QIOPTIQ Imaging Solutions, Fairport, N.Y., <www.qioptiqimaging.com>, 8 pages.

Schermelleh, L., et al., "Subdiffraction Multicolor Imaging of the Nuclear Periphery With 3D Structured Illumination Microscopy," Science 320:1332-1336, Jun. 2008.

Schermelleh, L., et al., "Supporting Online Material for Subdiffraction Multicolor Imaging of the Nuclear Periphery With 3D Structured Illumination Microscopy," Jun. 2008, <www.sciencemag.org/cgi/content/full/320/5881/1332/DC1>, 13 pages.

* cited by examiner

PROJECTION DEVICE FOR PATTERNED ILLUMINATION AND MICROSCOPY

CROSS-REFERENCE TO RELATED APPLICATION

This application claims the benefit of U.S. Provisional Application No. 61/012,478, filed Dec. 10, 2007, by the present inventor, the contents of which are hereby incorporated by reference.

BACKGROUND

This application generally relates to the area of optical microscopy, and specifically to patterned illumination in optical microscopy. Optical microscopy can be used in a variety of applications, including for viewing of biological samples and imaging of metallurgical objects. Optical widefield microscopy refers to broad illumination of a specimen in the object plane and obtaining images therefrom, in contrast to scanning confocal microscopy which refers to illumination and imaging of pin-hole sections and using recombining methods to reproduce the image. Optical widefield microscopy provides some visual depth in the axial direction (z-plane).

In optical microscopy, photobleaching is used to refer to the fluorescent excitation and resultant photochemical destruction of a fluorophore when under fluorescent illumination. For example, a fluorophore may be used in a fluorescently labeled or tagged substance, molecule or protein in a biological specimen, wherein the fluorescence emission is then projected to the image detector plane. However, since photobleaching occurs, this may complicate the observation of the fluorescent molecules, since they will eventually be destroyed by the light exposure necessary to stimulate them into fluorescing. This may be especially problematic in time-lapsed microscopy.

Fluorescence recovery after photobleaching (FRAP) refers to an optical technique which takes advantage of the principle of photobleaching to provide both qualitative and quantitative information about fluorescently labeled substances, molecules or proteins in a biological specimen. In FRAP, only a specified region of the biological specimen is illuminated, using for example a narrow bar pattern, until all or most fluorescence in the region of interest is bleached, then the movement or mobility of fluorescently labeled entities into this photobleached zone are monitored to observe preferred sites of localization of the new fluorescently labeled molecules. The fluorescence recovery in the photobleached zone may also be quantified to provide diffusion coefficients for the molecules of interest.

Photoactivation refers to an optical technique characterized by increased fluorescence contrast when a short pulse of activating light is used to photo-activate activatable molecules or proteins. In photoactivation, there is also only a specified region of the biological specimen illuminated and the movement or mobility of the activated fluorescently labeled entities is monitored and quantified.

In some conventional microscopes, the optical components assembled within are often assembled at the manufacturer level to provide rigid and exact positioning and orientations. In some attempts to improve resolution, complex configurations of lenses, light sources, and relatively expensive lasers may also be assembled by the manufacturer. Such microscopes may not provide the desired flexibility in substitution of components, or upgrading when a better-resolution component becomes available.

For example, in some applications a grid, Ronchi Ruling or diaphragm is inserted into a built-in fluorescence or brightfield illumination path of a widefield microscope to create a pattern onto a specimen in order to improve resolution. Generally, this requires inserting the grid or diaphragm into a field diaphragm slot of the microscope. However, this method becomes dependent on manipulating the existing built-in light path of the microscope. The built-in optical paths in some conventional microscopes were generally not designed to project such patterns onto the object plane accurately with high contrast and without distortion of the patterns. The manipulation of the built-in light path may also diminish the efficiency of the built-in fluorescence source.

Some conventional widefield microscopes have also not been designed to optimize the Point Spread Function of a point object. The Point Spread Function is a measure of the quality of the optical device. In incoherent imaging systems such as fluorescent microscopes the image formation process is linear and described by Linear System theory. Knowing the Point Spread Function of an optical device allows the use of deconvolution algorithms to generate software enhanced images, referred to as deconvolution microscopy. The better the intrinsic Point Spread Function of an optical device, the higher the quality of the image and the less computational complexity would be involved in deconvolving the image. The built-in optical paths in available widefield microscopes generally produce a high degree of out of focus light owing to their architecture, and there is high computational complexity when using deconvolution microscopy techniques.

SUMMARY

It would be advantageous to provide a microscope system to address at least some of the above-noted difficulties.

In one aspect, there is provided a projection device for use with an optical microscope. The optical microscope includes a lens configuration defining an object plane and projecting the object plane to a detector plane, and includes a photo-port for receiving of the detector plane. The projection device includes: a photo-port interface for attachment to the photo-port of the optical microscope and being optically coupled to the photo-port of the optical microscope; a light source interface for receiving of illumination from a light source, the illumination defining an illumination path; and a beam splitter located within the illumination path for directing the illumination path through the photo-port interface onto the object plane of the optical microscope and for directing the object plane of the optical microscope onto the detector plane.

In another aspect, there is provided an optical microscopy system including an optical microscope and a projection device. The optical microscope includes a lens configuration defining an object plane and projecting the object plane to a detector plane, and a photo-port for receiving of the detector plane. The projection device includes a photo-port interface for attachment to the photo-port of the optical microscope and being optically coupled to the photo-port of the optical microscope, a light source interface for receiving of illumination from a light source, the illumination defining an illumination path, and a beam splitter located within the illumination path for directing the illumination path through the photo-port interface onto the object plane of the optical microscope and for directing the object plane of the optical microscope onto the detector plane.

In another aspect, there is provided a method for projection within an optical microscope. The optical microscope includes a lens configuration defining an object plane and projecting the object plane to a detector plane, and includes a photo-port for receiving of the detector plane. The method includes externally projecting an illumination path through the photo-port of the optical microscope and onto the object plane.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

Example embodiments will now be described by way of example with reference to the accompanying drawings, through which like reference numerals are used to indicate similar features.

DETAILED DESCRIPTION

In some example embodiments, there is generally provided a projection device for use in patterned illumination microscopy that attaches externally to the photo-port of a widefield microscope.

In some example embodiments, there is generally provided a projection device that attaches externally to the photo-port of a widefield microscope and including an external light source which may be used as an alternative for, or concurrently with, the pre-existing microscope light source.

In some example embodiments, there is generally provided a projection device that attaches externally to the photo-port of a widefield microscope and including a pattern mask within an illumination path of the projection device for projecting one or a plurality of objects, structures or patterns onto the object plane of the optical microscope.

In one example embodiment, there is provided a projection device for use with an optical microscope. The optical microscope includes a lens configuration defining an object plane and projecting the object plane to a detector plane, and includes a photo-port for receiving of the detector plane. The projection device includes: a photo-port interface for attachment to the photo-port of the optical microscope and being optically coupled to the photo-port of the optical microscope; a light source interface for receiving of illumination from a light source, the illumination defining an illumination path; and a beam splitter located within the illumination path for directing the illumination path through the photo-port interface onto the object plane of the optical microscope and for directing the object plane of the optical microscope onto the detector plane.

In another example embodiment, there is provided an optical microscopy system including an optical microscope and a projection device. The optical microscope includes a lens configuration defining an object plane and projecting the object plane to a detector plane, and a photo-port for receiving of the detector plane. The projection device includes a photo-port interface for attachment to the photo-port of the optical microscope and being optically coupled to the photo-port of the optical microscope, a light source interface for receiving of illumination from a light source, the illumination defining an illumination path, and a beam splitter located within the illumination path for directing the illumination path through the photo-port interface onto the object plane of the optical microscope and for directing the object plane of the optical microscope onto the detector plane.

In another example embodiment, there is provided a method for projection within an optical microscope. The optical microscope includes a lens configuration defining an object plane and projecting the object plane to a detector plane, and includes a photo-port for receiving of the detector plane. The method includes externally projecting an illumination path through the photo-port of the optical microscope and onto the object plane. The method may also include externally positioning a pattern mask within the illumination path, and projecting from the pattern mask one or a plurality of objects, structures or patterns onto the object plane of the optical microscope.

Figure 1:
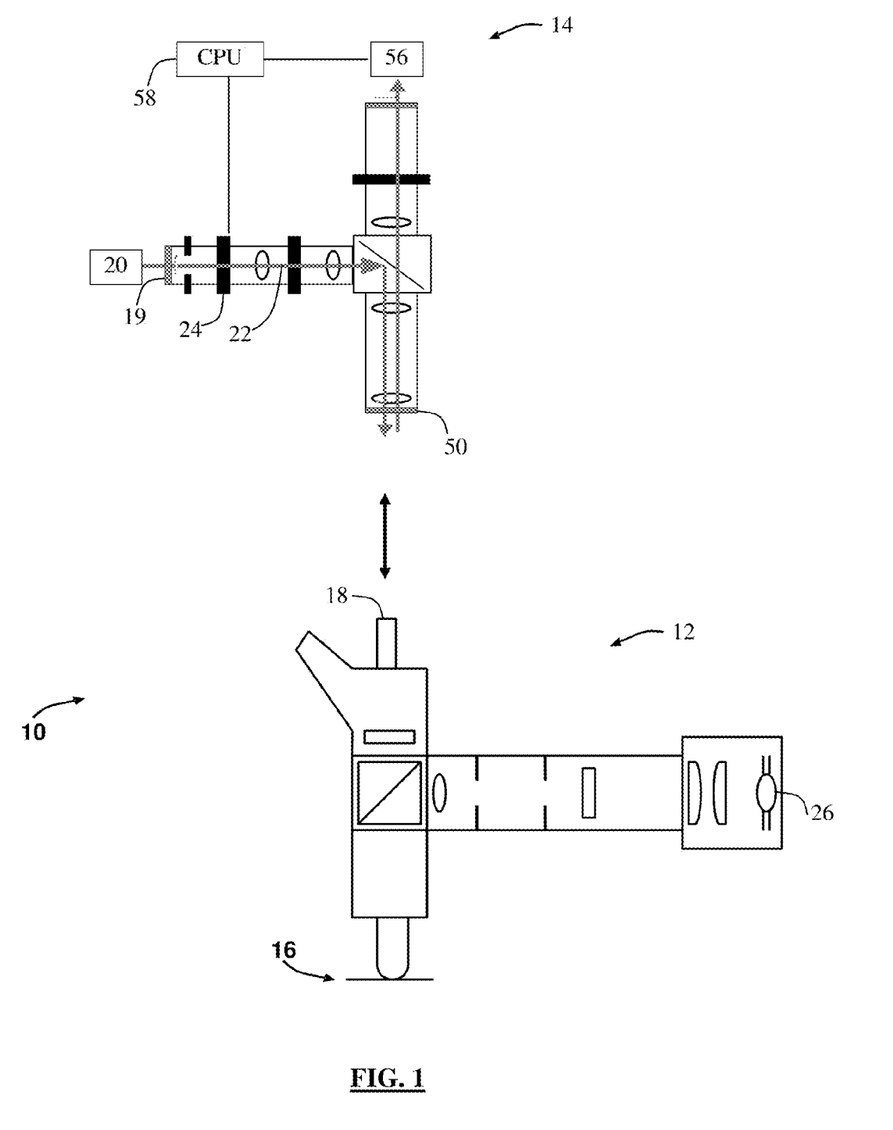
FIG. 1 shows an exploded side diagrammatic view of a microscope system in accordance with an example embodiment.

Reference is now made to FIG. 1, which shows an exploded side diagrammatic view of a microscope system 10 in accordance with an example embodiment. The microscope system 10 includes an optical microscope 12 and a projection device 14 for attachment to the optical microscope 12. Generally, the microscope 12 includes a lens configuration defining an object plane 16 and projecting the object plane 16 to a detector plane as received in a photo-port 18. The projection device 14 attaches externally to the photo-port 18 of the microscope 12. The projection device 14 includes a light source interface 19 for receiving of illumination from a light source 20, the illumination defining an illumination path 22. A pattern mask 24 is also located within the illumination path 22 and includes components for projecting one or a plurality of objects, structures or patterns onto the object plane 16 of the microscope 12.

Figure 2:
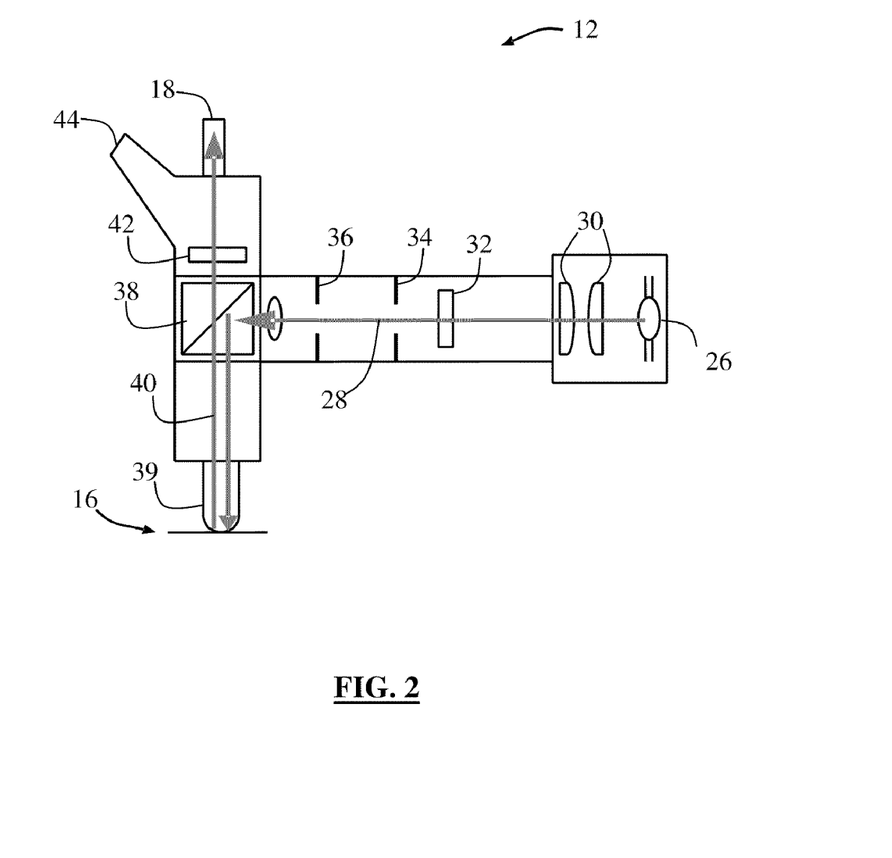
FIG. 2 shows a side diagrammatic view of an upright wide-field microscope to be used in the microscope system of FIG. 1.

Reference is now made to FIG. 2, which shows a detailed diagrammatic side view of the microscope 12. The microscope 12 shown is for example an upright widefield epifluorescent microscope. The projection device may be used with either an upright microscope 12, an inverted microscope (not shown) or configured for industrial applications. A light source 26 such as an arc lamp is used to provide another illumination source and defines illumination path 28. A collector lens 30 generally causes the illumination path 28 from the light source 26 to be directed in a parallel beam. A filter slider 32 is used in the illumination path 28 to allow specified wavelengths to pass therethrough (such as specified fluorescent wavelengths). An aperture diaphragm 34 and a field diaphragm 36 are also positioned within the illumination path 28 and spaced apart to provide further collimation of the illumination path 28. The field diaphragm 36 may be adjusted to increase or decrease a radius of the illumination path 28. A fluorescence filter cube 38 provides additional filtering for fluorescent wavelengths and also acts as a beam-splitter of the illumination path 28. An objective 39 includes further lenses which may be used to focus the illumination path 28 onto the object plane 16. At this stage, the fluorescent light may generally illuminate a specimen located at the object plane 16, or may excite certain fluorophores contained or tagged within the specimen.

The object plane 16 may be projected onto a detector plane as received in the photo-port 18. As indicated by light path 40, the light path 40 once again passes through the fluorescence filter cube 38. Another filter slider 42 provides further filtering for fluorescent wavelengths. The detector plane may be projected to the photo-port 18 and may also be directed to an eyepiece 44, for example using further lenses (not shown). Additional lenses and optical components may be present for operation of the microscope 12 but are not shown for simplicity.

Referring to FIG. 1, it can be appreciated that since the "detector plane" is generally formed from parallel light, the detector 56 used for detecting the detector plane would be focused "at infinity", as can be understood by those skilled in the art. Thus, although the detector plane is received by the photo-port 18, the detector plane can exist past the photo-port 18 if necessary, up to and including to the detector 56 (and past the detector 56, if necessary). Multiple detector planes may therefore exist and would be utilized depending on the particular application or location of a detector being used.

In some conventional systems, a moving grid, Ronchi Ruling or a digital diaphragm is inserted into the existing built-in illumination path 28 of the microscope 12 to create a pattern onto the object plane 16. Generally, this requires removing the field diaphragm 36 and inserting the grid or diaphragm into the just-removed radial slot left by the field diaphragm 36. However, this method may be inflexible for operation as it becomes dependent on manipulating the existing illumination path 28 of the microscope 12. A type of moving grid method is generally described in U.S. Pat. No. 6,376,818, issued to Wilson et al. on Apr. 23, 2002, the contents of which are hereby incorporated by reference.

Figure 3:
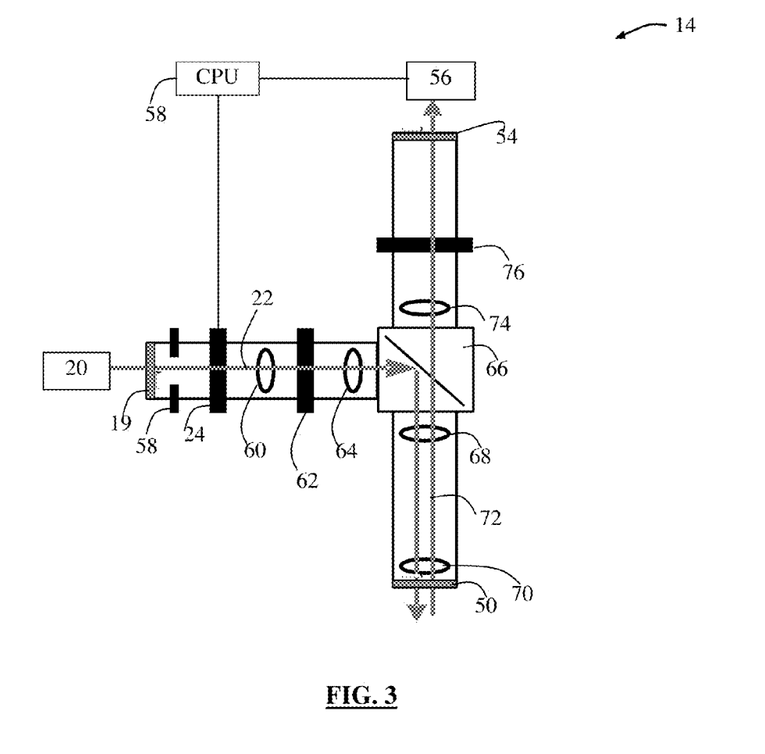
FIG. 3 shows a side diagrammatic view of a projection device for attachment to the microscope of FIG. 2 in accordance with an example embodiment.

Reference is now made to FIG. 3, which shows a detailed diagrammatic side view of the projection device 14 in accordance with an example embodiment. The projection device 14 generally provides another light source 20 which may be used as an alternative for, or concurrently with, the microscope light source 26 (FIG. 2). As shown, the projection device 14 includes a photo-port interface 50 that attaches the projection device 14 to the photo-port 18 of the microscope 12. The light source interface 19 receives illumination from the light source 20 and provides the illumination path 22 in this embodiment. A detector interface 54 is also shown which provides connection to a detector 56. The detector 56 receives and detects the projected detector plane. An example detector 56 is a charged coupled device (CCD) camera connected to a controller such as a central processing unit (CPU) 58. The CPU 58 may then perform storage or further post-processing on a received image.

Figure 4A:
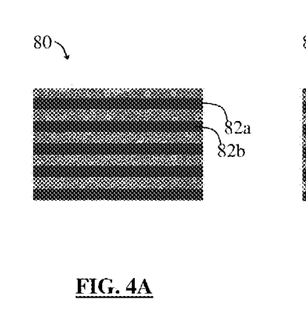
FIGS. 4A, 4B and 4C show a specimen in an object plane and an example moving grid pattern projected onto the specimen by the projection device of FIG. 3.
Figure 4B:
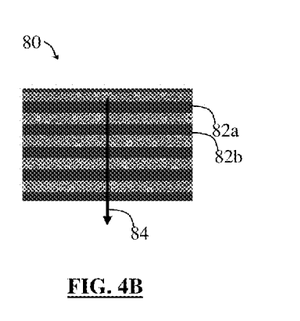
Figure 4C:
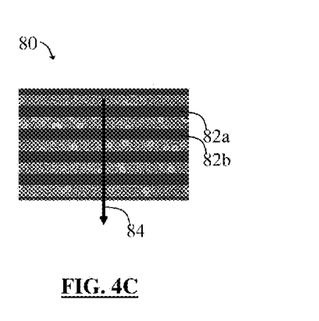
Figure 5A:
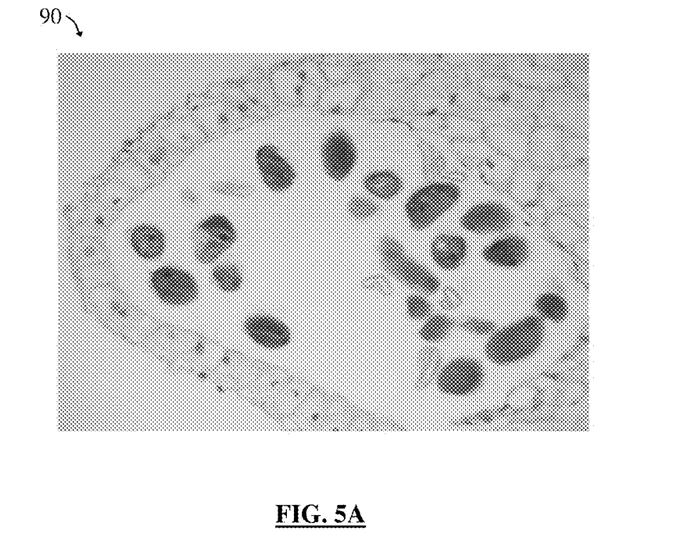
FIG. 5A shows another example specimen in an object plane.
Figure 5B:
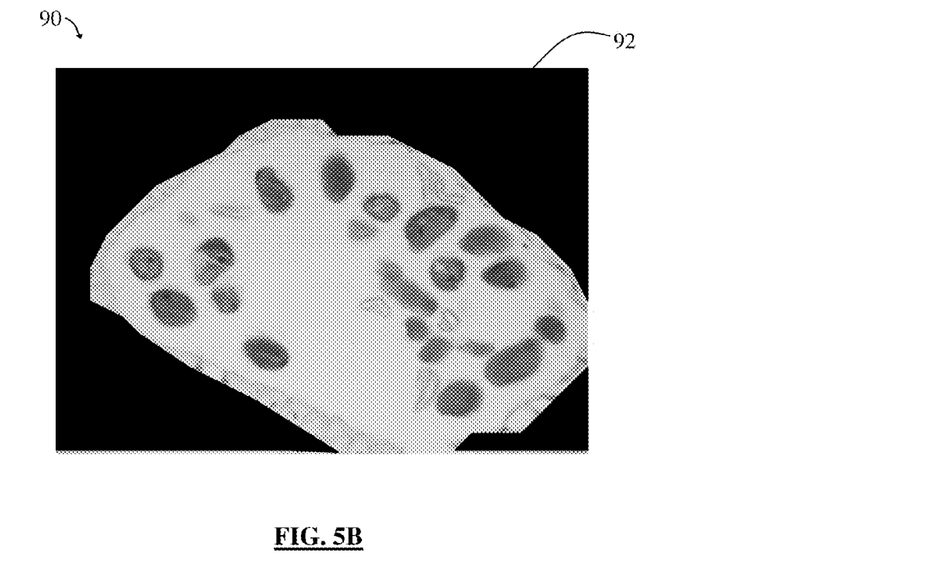
FIG. 5B shows an example digital diaphragm image projected onto the specimen of FIG. 5A by the projection device of FIG. 3.

The pattern mask 24 is located within the illumination path 22 for projecting one or a plurality of objects, structures or patterns onto the object plane 16 of the optical microscope 12. Referring briefly to FIG. 4, the pattern mask 24 may for example include a moving grid. Referring briefly to FIG. 5, the pattern mask 24 may for example include a digital diaphragm for targeted illumination. Generally, the pattern mask 24 may be removably inserted into the projection device 14, for example using a radial slot defined within the projection device 14. Different pattern masks 24 may be used dependent on the particular application. The pattern mask 24 is described in greater detail below.

Referring still to FIG. 3, light from the light source 20 (for example an arc lamp, LED or laser) defines the illumination path 22. A light guide (not shown) may be used between the light source 20 and light interface 19 depending on the type of light source 20 being used. A stop aperture 58 acts as a fixed diaphragm to stop any stray light or scatter in the illumination path 22. The illumination path 22 proceeds through the pattern mask 24 (described in detail below). Collimating lens 60 assists in collimating the illumination path 22. An excitation filter wheel 62 includes an excitation filter which allows specified wavelengths to pass therethrough (such as specified fluorescent wavelengths or a bandpass spectrum). A relay lens 64 then projects the illumination path 22 to the beam splitter 66. The beam splitter 66 may for example be a dichroic, as would be understood by those skilled in the art. The illumination path 22 is projected through a second relay lens 68, followed by a field lens 70 through to the photo-port 18 (FIG. 2) of the microscope 12. The field lens 70 may for example magnify 1.5 or 2.4× and these contribute to a gain in resolution. The field lens 70 may alternatively be a IX lens.

Referring to FIGS. 2 and 3, the beam splitter 66 also enables projection from the object plane 16 onto a detector plane. The detector plane is conjugate to the object plane 16. As indicated by light path 72, which may be an extension of light path 40, the object plane is directed through the beam splitter 66 and passes through a relay lens 74 an emission filter wheel 76. The image is then detected and/or captured by the detector 56 coupled at the detector interface 54.

An example embodiment of the pattern mask 24 shown in FIG. 3 will now be described in detail, wherein the pattern mask 24 includes a moving grid or Ronchi Ruling. Reference is now made to FIGS. 4A, 4B and 4C, which show a specimen 80 in the object plane 16 and an example moving grid pattern projected onto the specimen 80 by the pattern mask 24. Providing such a moving grid pattern is sometimes referred to as structured illumination microscopy (SIM).

Referring to FIG. 4A, the grid forms gridlines 82 onto the specimen 80. Referring to FIGS. 4B and 4C, as indicated by direction arrow 84, the gridlines 82 are projected onto specimen 80 and are moved in ⅓ steps of a grid period length. Images of the specimen 80 are received in the detector plane by the detector 56 (FIG. 1) and an algorithm is used by the CPU 58 (FIG. 1) to construct the image of the specimen 80. Thus, one reconstructed image actually consists of three split-second captures of the grid. The first image is taken at any position of the grid, the grid is then moved linearly by ⅓ of the grid period length to capture the second image, and another ⅓ to capture the third image. All of these steps typically occur in under one second, generating one structured-light image. More or less than 3 phase shifts may also be used depending on the particular application and algorithms.

In one example embodiment, the moving grid may be mounted on a piezo-electronically driven actuator (not shown). Once inserted into the illumination path 22 (FIG. 1) of the projection device 14, amplified voltage is applied to the actuator to change its length. The actuator may provide accurate repositioning of the grid pattern.

Referring to FIG. 1, the CPU 58 may also be used to synchronize the actuator in the grid or pattern mask 24 with the detector 56 to coordinate the detection the images at the appropriate times (corresponding to the grid period lengths). The exact algorithm to coordinate the synchronization and process the three images together may be readily configured by those skilled in the art, or may for example be implemented by Optigrid™ available from QIOPTIQ IMAGING SOLUTIONS. Further post-processing may also be performed by the CPU 58, as would be readily configured by those skilled in the art.

Another example embodiment of the pattern mask 24 shown in FIG. 3 will now be described in detail, wherein the pattern mask 24 includes a digital diaphragm or a DLP (Digital Light Processing). Reference is now made to FIGS. 5A and 5B, wherein FIG. 5A shows another example specimen 90 in the object plane 16; and FIG. 5B shows an example digital diaphragm image 92 projected onto the specimen 90. Generally, targeted illumination refers to illuminating only certain subsections of the object plane 16 (FIG. 1). In the example embodiment shown, the digital diaphragm image 92 can be a desired polygonal shape to illuminate specified regions of interest in the specimen 90. The polygonal shape may be adjustable by digital control from the CPU 58 (FIG. 1). With a digital diaphragm the pattern employed can be of any shape and multiple patterns can be projected simultaneously or sequentially.

In some other example embodiments, a mechanical diaphragm is used instead of a digital diaphragm in the pattern mask 24. The mechanical diaphragm may provide a relatively basic illumination shape such as a circle, square or rectangular shape.

Another example embodiment which uses targeted illumination is in Fluorescence Recovery After Photobleaching (FRAP). The digital diaphragm would be used in FRAP to superimpose the digital diaphragm image 92. This for example allows photobleaching in the specified zone and measurement of entry of new fluorescent molecules into the irradiated zone of a sample, without unnecessarily photobleaching fluorescent molecules outside the photobleached zone. The digital diaphragm also allows for multiple defined regions to be illuminated (photobleached) simultaneously or sequentially.

Another example embodiment which uses targeted illumination is Photoactivation. The digital diaphragm here would be used to activate photactivatable molecules only within the region defined by the diaphragm, without unnecessarily activating molecules outside this region.

Referring to FIG. 3, it can be appreciated that the light source 20 may be one or multiple LEDs (light emitting diodes) each emitting a different wavelength of light. The wavelengths are defined by simply turning the LED of interest on or off. LEDs may also provide a coherent light source. An advantage of coherent light is that it may have the ability to penetrate tissue samples more deeply than non-coherent illumination. In such embodiments the projection device 14 may not require one or both filter wheels 62, 76.

Referring to FIG. 1, in some example embodiments the light source 20 is one or more lasers, each with defined illumination wavelengths. Lasers also provide coherent light. Such embodiments may not require one or both filter wheels. 62, 76.

Referring to FIG. 1, in some example embodiments the projection device 14 leaves the pre-existing or built-in fluorescence light source 26 of the microscope 12 available for other purposes and techniques such as FRAP, TIRF (total internal reflection fluorescence) and other such techniques as would be appreciated by those skilled in the art. Thus, the light source 26 of the microscope 12 and the light source 20 of the projection device 14 may be used in combination, either concurrently or sequentially. This would permit combining of light sources 20, 26 onto the same object plane 16, which may for example be used for the following applications: (1) structured illumination microscopy using projection device 14 combined with FRAP using the microscope 12 built-in light path; (2) deconvolution microscopy using projection device 14 combined with FRAP using the microscope 12; (3) structured illumination microscopy using projection device 14 combined with photoactivation using microscope 12; and (4) deconvolution microscopy using projection device 14 combined with targeted illumination using microscope 12. Such examples are not intended to be limiting, and other combinations may be used, depending on the particular application.

Referring to FIG. 1, in some example embodiments the pattern mask 24 in the projection device 14 is removed and the projection device 14 thereby uses the light source 20 as an external light source through the photo-port 18 to the microscope 12.

In some example embodiments, the projection device 14 is merely used for an external light source to the microscope 12, with or without the pattern mask 24, allowing for the use of post processing software techniques such as deconvolution to produce the final enhanced image.

Referring to FIG. 3, in some example embodiments the light interface 19, photo-port interface 50, and detector interface 54 may for example be any permanent or removably attachable (non-permanent) connection or coupling. For example, the interfaces may be connected via corresponding screw threads, flange-and-groove connections, and the like, or coupled using additional light guides.

Example embodiments are not limited to fluorescent illumination of biological specimens but may also be used in imaging for material science purposes. For example, the projection device 14 may be used in metallurgical applications such for the inspection and measurement of wafers, chips or integrated circuits. Reflected-light imaging using visible light as the light source 20 (FIG. 1) could be used. In other example embodiments, fluorescence illumination could be used as the light source 20 (FIG. 1). In such applications, the projection device 14 may project the pattern mask 24 onto the particular material.

In some example embodiments, the projection device 14 may be assembled for mass production.

While fluorescence in microscopy has been described in detail, it can be appreciated that other forms of microscopy may take advantage of the projection device, for example in brightfield microscopy.

In some example embodiments, the projection device may be adapted as appropriate for use in scanning confocal microscopy. In such applications, a light source would still be projected by the projection device through the photoport of the microscope.

While the invention has been described in detail in the foregoing specification, it will be understood by those skilled in the art that variations may be made without departing from the scope of the invention.

The embodiments of the invention in which an exclusive property or privilege is claimed are defined as follows:

1. A projection device for use with an optical microscope, the optical microscope having a lens configuration defining an object plane and projecting the object plane to a detector plane, the optical microscope including a photo-port for receiving of the detector plane, the projection device comprising:

a photo-port interface for attachment to the photo-port of the optical microscope and being optically coupled to the photo-port of the optical microscope;

a light source interface for receiving of illumination from a light source, the illumination defining an illumination path;

a beam splitter located within the illumination path for directing the illumination path through the photo-port interface onto the object plane of the optical microscope and for directing light from the detector plane to a detector interface; and a pattern mask located within the illumination path for projecting one or a plurality of objects, structures, or patterns directly on a sample located at the object plane of the optical microscope.

2. The projection device of claim 1, wherein the detector interface is for coupling to a detector.

3. The projection device of claim 2, wherein the detector is a charged coupled device (CCD) camera.

4. The projection device of claim 1, wherein the pattern mask is removably insertable into the projection device.

5. The projection device of claim 1, wherein the pattern mask further comprises a moving grid for projection of a moving grid pattern onto the object plane.

6. The projection device of claim 5, further comprising a controller for synchronizing operation of the moving grid with controlling of a detector coupled to the detector interface.

7. The projection device of claim 1, wherein the pattern mask further comprises a digital diaphragm.

8. The projection device of claim 1, wherein the pattern mask further comprises a DLP (Digital Light Processing).

9. The projection device of claim 1, wherein the pattern mask further comprises a Ronchi Ruling.

10. The projection device of claim 1 for use in targeted illumination.

11. The projection device of claim 1 for use in FRAP (fluorescence recovery after photobleaching).

12. The projection device of claim 1, wherein the projection device is removably attachable to the microscope at the photo-port interface.

13. The projection device of claim 1, wherein the photo-port interface attaches externally to the photo-port of the optical microscope.

14. The projection device of claim 1, wherein one or more wavelengths of light are selected by means of optical filters.

15. The projection device of claim 1, wherein the light source includes one or more light emitting diodes or lasers for providing coherent light.

16. The projection device of claim 1 for use in deconvolution microscopy.

17. An optical microscopy system comprising:
    an optical microscope having:
        a lens configuration defining an object plane and projecting the object plane to a detector plane, and
        a photo-port for receiving of the detector plane; and
    a projection device having:
        a photo-port interface for attachment to the photo-port of the optical microscope and being optically coupled to the photo-port of the optical microscope,
        a light source interface for receiving of illumination from a light source, the illumination defining an illumination path,
        a beam splitter located within the illumination path for directing the illumination path through the photo-port interface onto the object plane of the optical microscope and for directing light from the detector plane to a detector interface, and
        a pattern mask located within the illumination path for projecting one or a plurality of objects, structures, or patterns directly on a sample located at the object plane of the optical microscope.

18. The optical microscopy system of claim 17, wherein the pattern mask further comprises a moving grid for projection of a moving grid pattern onto the object plane.

19. The optical microscopy system of claim 17, wherein the optical microscope further includes a second light source for projection onto the object plane.

20. The optical microscopy system of claim 19, wherein the second light source provides fluorescence or brightfield illumination.

21. The optical microscopy system of claim 19, wherein the second light source is used for FRAP, photoactivation, or targeted illumination.

22. A method for projection within an optical microscope, the optical microscope having a lens configuration defining an object plane and projecting the object plane to a detector plane, the optical microscope including a photo-port for receiving of the detector plane, the method comprising:
    externally projecting an illumination path through the photo-port of the optical microscope and onto the object plane;
    externally positioning a pattern mask within the illumination path; and
    projecting from the pattern mask one or a plurality of objects, structures, or patterns directly on a sample located at the object plane of the optical microscope.

23. The method of claim 22, further comprising:
    positioning a detector interface for detecting from the detector plane; and
    coupling the detector interface to a detector.

* * * * *